United States Patent [19]

Okamura et al.

[11] 3,909,473

[45] Sept. 30, 1975

[54] CIS-1,4-POLYISOPRENE RUBBER COMPOSITION HAVING IMPROVED MECHANICAL PROPERTIES

[75] Inventors: Takayuki Okamura; Shobu Minatono; Junnosuke Yamauchi; Kazuhisa Yamauchi, all of Ibaragi, Japan

[73] Assignee: Kuraray Co. Ltd., Kurashiki, Japan

[22] Filed: Nov. 30, 1973

[21] Appl. No.: 420,628

[30] Foreign Application Priority Data
Dec. 2, 1972 Japan.............................. 47-120961

[52] U.S. Cl..... 260/23.7 M; 260/23.7 R; 260/42.29; 260/42.32; 260/42.47; 260/78.4 D; 260/94.7 A; 260/752; 260/762
[51] Int. Cl.$^2$... C08L 91/00; C08K 3/22; C08F 8/10
[58] Field of Search............ 260/78.4 D, 94.7 A, 42, 260/42.29, 42.32, 42.47, 762, 752, 23.7 M, 23.7 R

[56] References Cited
UNITED STATES PATENTS

| | | | |
|---|---|---|---|
| 2,662,874 | 12/1953 | Brown.......................... | 260/78.4 D |
| 3,598,793 | 8/1971 | Koch............................ | 260/94.7 A |
| 3,644,248 | 2/1972 | Luijk et al..................... | 260/23.7 M |

OTHER PUBLICATIONS
Brown et al.–Ind. Eng. Chem. 47, 1006–1012 (1955)

*Primary Examiner*—Donald E. Czaja
*Assistant Examiner*—H. H. Fletcher
*Attorney, Agent, or Firm*—Bacon & Thomas

[57] ABSTRACT

The mechanical properties of an unvulcanized rubber composition having, as the rubber material, maleinized polyisoprene rubber which contains zinc oxide as one of the compounding ingredients can be markedly increased by the addition of an oxide or a hydroxide of a metal belonging to Groups IA, IIA and IVB of the Periodic Table.

3 Claims, No Drawings

CIS-1,4-POLYISOPRENE RUBBER COMPOSITION HAVING IMPROVED MECHANICAL PROPERTIES

BACKGROUND OF THE INVENTION

1. Field of the Invention

This invention relates to a process for producing unvulcanized rubber compositions having improved mechanical properties by using, as the rubber material, modified synthetic cis-1,4-polyisoprene rubber having bound maleic anhydride units in the polymer.

2. Description of the Prior Art

Synthetic cis-1,4-polyisoprene rubber (hereinafter referred to as IR) is well known as a synthetic product corresponding to natural rubber and it has excellent properties similar to those of natural rubber. However, IR has one serious shortcoming in that it has rather poor mechanical properties in the unvulcanized state; i.e., so-called "green strength." As one method for improving the green strength, it has been proposed to react maleic anhydride (hereinafter sometimes referred to as "MAn") with IR, namely maleinization (e.g., U.S. Pat. No. 3,567,691, British Pat. Nos. 1,141,558 and 1,204,729), whereby green strength can be increased to a considerable extent.

IR having the bound MAn in the polymer, namely maleinized IR (hereinafter sometimes referred to as "MAn-IR") shows improved mechanical properties and also shows high mechanical properties in an unvulcanized composition compounded with compounding ingredients (e.g., zinc oxide) for preparing vulcanizates. It is thought that one of the reasons for the increase in the mechanical properties is that the zinc oxide (used generally as one of the compounding ingredients) reacts with the bound MAn in the polymer to produce an ionic linkage due to the metallic bonds. Therefore, the green strength of the unvulcanized composition may be presumed to increase so much by increasing the amount of zinc oxide when the compounding ingredients containing zinc oxide are mixed with MAn-IR to prepare the composition. But, this has been found not to be true. On the contrary, as a matter of fact, the increase in green strength is very slow.

SUMMARY OF THE INVENTION

Accordingly, it is an object of the present invention to markedly increase the green strength of MAn-IR unvulcanized compositions containing zinc oxide as one of the compounding ingredients.

It has now been found that the mechanical properties of the MAn-IR unvulcanized composition containing zinc oxide as one of the compounding ingredients can be markedly increased, if the zinc oxide is used in combination with an oxide or a hydroxide of a metal belonging to Groups IA, IIA and IVB of the Periodic Table.

Thus, according to the present invention, there is provided a process for producing an unvulcanized rubber composition to be used for the preparation of a vulcanizate having, as the rubber material, MAn-IR having a bound MAn content of 0.03 to 2.5 moles per 100 recurring units of isoprene monomer in the polymer, characterized in that said MAn-IR is mixed with compounding ingredients containing at least (a) zinc oxide and (b) 0.5 to 3.0 parts of the above mentioned oxide or hydroxide per 100 parts by weight of MAn-IR, whereby the green strength of the unvulcanizate can be remarkably increased as compared with the unvulcanizate not containing the compound (b).

DESCRIPTION OF THE PREFERRED EMBODIMENTS

It should be noted that the unvulcanizate prepared by using a combination of (a) zinc oxide and (b) the oxide or hydroxide of the metal according to this invention shows by far higher mechanical properties than the unvulcanizate prepared by using only zinc oxide in the same amount as the total of (a) and (b). The oxide or hydroxide of the metal belonging to Groups IA, IIA or IVB of the Periodic Table may be referred to hereinafter as a "supporting additive."

Since the unvulcanized composition of this invention is used for preparing shaped vulcanizates, the following restrictions are necessarily imposed on the supporting additive:

1. It must not inhibit the vulcanization;
2. it must not lower any physical properties of the vulcanizate;
3. it must not coarsen the surface of the unvulcanized stock; and
4. it must not have undesirable influences on the mill mixing.

The supporting additives used in the present invention afford a marked effect for improving the mechanical properties of the unvulcanized MAn-IR composition containing zinc oxide and satisfy every restrictive condition mentioned above. The amount of the supporting additive should be in a range between 0.5 and 3.0 parts by weight per 100 parts by weight of MAn-IR ("part by weight per 100 parts by weight of the rubber" is hereinafter referred to as "phr"). Amounts of the supporting additives less than 0.5 phr are not sufficient to increase the mechanical properties of the unvulcanized composition. When the supporting additive is used in an amount of more than 3.0 phr, the vulcanization rate becomes too rapid even though the mechanical properties are increased. Such tendencies are outstanding particularly for the hydroxides of the metals of Group IA. Further, if too much of the supporting additive is used, the properties of the vulcanizate are undesirably affected; that is, tensile strength, elongation, resistance to flex cracking and heat build-up of the vulcanizate after vulcanization for a long time becomes deteriorated.

Preferred examples of the supporting additives used in this invention include alkali metal hydroxides (e.g. LiOH, NaOH, KOH); alkali earth metal oxides and hydroxides (e.g., $Mg(OH)_2$, $Ca(OH)_2$, $Ba(OH)_2$, MgO, CaO), and oxides of metals of the carbon group (e.g., PbO, $Pb_3O_4$). Metal compounds other than oxides and hydroxides of these metals, for example, chlorides, carbonates and sulfates (e.g., KCl, $Na_2CO_3$, $CaSO_4.2H_2O$) do not give good results for improving the green strength. In addition, the oxides, hydroxides and other compounds of metals other than those of Groups of IA, IIA and IVB of the Periodic Table are not effective and in some cases, they stain the unvulcanized composition and invite decreased mechanical properties of the vulcanizate.

The IR to be used in the present invention may be prepared by any method, and have any degree of cis-1,4 content but generally, IR having a cis-1,4-content of more than 80% prepared by polymerizing isoprene with a Ziegler-type catalyst or an anionic catalyst is preferred. Upon evaluation of the entire physical properties of the rubber composition obtained by this invention, it is more preferable to use a polyisoprene having a cis-1,4-content of above 95% prepared with a Ziegler-type catalyst.

Generally, the MAn-Ir employed in the present invention may be defined as cis-1,4-polyisoprene having bound maleic anhydride units contained in the polymer molecule. However, different derivatives thereof may be employed in the present invention.

The first type of MAn-IR is an adduct obtained by reacting IR with maleic anhydride. Such adducts are known and processes for producing the same are described in, for example, U.S. Pat. No. 2,662,874; British Pat. No. 1,119,629; and British Pat. No. 1,204,730. Those skilled in the art are aware of techniques for reacting maleic anhydride with IR to produce these adducts. If necessary, a free radical yielding catalyst or a solvent may be used in the reaction. For example, the reaction can be effected by adding maleic anhydride and a free radical yielding catalyst to a solution of IR, and heating the resulting homogeneous or heterogeneous solution in an inert gas atmosphere. The reaction in the homogeneous solution system may be carried out in an aromatic hydrocarbon solvent (e.g., benzene, toluene, xylene, etc.) or in an aliphatic hydrocarbon solvent (e.g., n-hexane, n-heptane, etc.), and the reaction in a heterogeneous solution system may be carried out by using as the solvent n-butane or isopentane or by using a mixture of a solvent and a precipitant. The reaction may also be effected in the absence of such free radical catalysts.

A second type of MAn-IR useful in the present invention is a product obtained by converting the bound maleic anhydride groups in the polymer into the free acid form, the metal salt form, the mono- or di-ester form, the amide form or the imide form, by reacting the adduct obtained in the first group described with, for example, alcohols such as methanol, ethanol or n-butanol or amines such as ammonia, n-butyl amine, iso-butyl amine, allyl amine, di-n-butyl amine, monoethanol amine, diethanol amine, triethyl amine, tri-isopropanol amine or pyridine, if necessary in the presence of a catalyst such as p-toluene sulfonic acid. Thus, the maleic anhydride group may be converted into a maleic acid ester, such as the alkyl esters having from 1 to 8 carbon atoms. Likewise, the maleic anhydride group may be converted into the free acid form or the acid salt form (such as a metal salt) by hydrolyzing the acid anhydride group with either an acid or an alkali. Either one or both of the carboxylic groups of the maleic anhydride group may be converted into the corresponding ester, amide or imide, or the free acid or acid salt form. The conditions of reaction are not critical, and those conditions which are generally used for reacting an acid anhydride with the aforementioned materials to produce the above derivatives can be employed, with those skilled in the art being aware of such techniques.

A third form of the MAn-IR used in the present invention comprises adducts obtained by reacting a maleic anhydride derivative with IR, the maleic anhydride derivative including, for example, mono-or di-esters of maleic acid (such as the alkyl esters having from 1 to 8 carbon atoms), maleic acid amides or maleic acid imides. This form of the MAn-IR can be produced by reacting the maleic acid esters, maleic acid amides, or maleimides with IR under suitable reaction conditions, such as those conditions discussed above in the reaction between IR and maleic anhydride per se. These maleic anhydride derivatives are per se known compounds, and the reaction product of these derivatives with IR can be prepared using known techniques.

A fourth type of the MAn-IR useful in the present invention is a polymer containing both maleic anhydride and one or more of the aforesaid maleic anhydride derivatives in the molecular chain thereof. These polymers may be produced by incompletely reacting an adduct of IR with maleic anhydride with, for example, an alcohol or an amine to incompletely convert the maleic anhydride group into, for example, an ester, an amide or an imide, or likewise the free acid form thereof or the acid salt form thereof.

A fifth type of the MAn-IR useful in the present invention comprises mixtures of the above four types, such as a mixture of the first adduct with any of the second, third or fourth types of material.

Therefore, the terminology MAn-IR includes all of the above types of materials, all being operable in the present invention.

Processes for producing such MAn-IR are more fully disclosed in copending U.S. application Ser. No. 370,380, filed June 15, 1973, the disclosure of which is hereby expressly incorporated herein by reference.

With reference to the excellent mechanical properties and good processability of the obtained unvulcanized composition (e.g., banding on the mill, mill shrinkage, extrudability) and satisfactory physical properties of the vulcanizate, the bound MAn content in the MAn-IR used in the invention should be in a range from 0.03 mole to 2.5 moles, preferably 0.05 to 0.9 mole per 100 recurring units of isoprene monomer in the IR polymer.

When the supporting additive is mixed with the MAn-IR without the zinc oxide or in combination with only a very small amount of zinc oxide, the unvulcanized composition having a high green strength may be obtained, but the vulcanizate prepared from said unvulcanizate defectively shows low 300% modulus, tensile strength and tear resistance because of an insufficiently low cross-linking density. For this reason, the zinc oxide should be used in amounts conventionally employed for vulcanizing IR, namely 2 to 8 phr or more.

As long as the compounding ingredients contain an oxide or hydroxide of a metal belonging to Groups IA, IIA and IVB of the Periodic Table in addition to zinc oxide, the unvulcanized MAn-IR compositions of this invention can be prepared in the same conventional manner as unvulcanized compositions prepared from IR or natural rubber. For example, sulfur or other vulcanizing agents, vulcanization accelerators, stearic acid, fillers (e.g., carbon black), extenders or antioxidants may be added to the MAn-IR, if necessary. Generally, any conventional rubber compounding ingredient can be used in the compositions of the present invention.

The MAn-IR may be used singly or in combination with a suitable amount of ordinary IR for adjusting the MAn content. The MAn-IR used in the invention is meant to include blends containing ordinary (i.e., non-maleinized) IR as an extender. In this case, the bound MAn content mentioned above is applicable to a blend of MAn-IR and ordinary IR (i.e., the total bound MAn should be within the above range).

Presently preferred and practical embodiments of the present invention are illustratively shown in the following examples, which are not intended to be limiting in any manner.

EXAMPLE 1

As the starting IR, there was used a high cis-1,4-polyisoprene rubber having a cis-1,4-content of 98% and having an intrinsic viscosity ($\eta$) of 3.52 dl/g measured in toluene at 30°C. which had been prepared with a Ziegler-type catalyst (i.e., triisobutyl aluminum - titanium tetrachloride).

To a 3% by weight solution of said IR in xylene, 3 phr of maleic anhydride and 0.02 phr of benzoyl peroxide were added. After purging with nitrogen, the resultant mixture was heated at a temperature of 100°C. for 3 hours. After the reaction, the reaction mixture was poured into a large amount of acetone to precipitate and recover the formed MAn-IR having 0.08 mole of bound maleic anhydride per 100 recurring units of isoprene monomer in the IR polymer.

The so-obtained MAn-IR (100 parts), HAF carbon black (45 parts), vulcanization accelerator NOBS (N-oxydiethylene-2-benzothiazole sulfenamide) (1 part), sulfur (2 parts), stearic acid (3 parts), zinc oxide (5 parts), antioxidant 2246 [2,2'-methylene bis-(4 methyl-6-tert-butylphenol)] (1 part) and the prescribed amounts of the metal compounds shown in Table 1 were mixed on a mixing mill [8 inch roll; roll temperature, 55°C.; Mooney viscosity after mixing (ML $_{1+4}$ 100°C.) 50] to give several unvulcanized compositions.

The mechanical properties of the obtained unvulcanized compositions are also shown in Table 1. Table 1 also shows the physical properties of the vulcanizates obtained by curing the compositions at 145°C. for 27 minutes.

EXAMPLE 2

An unvulcanized composition was prepared from the same MAn-IR as used in Example 1 by means of B-type Banbury mixer. More specifically, MAn-IR (100 parts-), vulcanization accelerator NOBS (1 part), stearic acid (3 parts), HAF carbon black (45 parts), sulfur (2 parts), zinc oxide (5 parts), antioxidant 2246 (1 part), and calcium hydroxide (2 parts) were mixed with the Banbury mixer. The speed of revolution was 76 r.p.m. and the starting temperature was 50°C. Then, sulfur (2 parts) was added and the resulting composition was mixed on a mill mixer (8 inch roll).

The so-obtained unvulcanized composition (Mooney viscosity (ML$_{1+4}$100°C.) 50) showed a 300% modulus of 3.0 kg/cm$^2$ and a tensile strength of 6.1 kg/cm$^2$ (Instron tester cross head speed, 2 cm/minute at 30°C.).

The same procedure as above was repeated except that zinc acetate (2 parts) was used in place of calcium hydroxide (2 parts). The green strength of the resultant unvulcanized composition was as low as 1.7 kg/cm$^2$ (300% modulus) and 2.8 kg/cm$^2$ (tensile strength).

EXAMPLE 3

The MAn-Ir used in Example 1 (100 parts), calcium carbonate (75 parts), magnesium hydroxide (2 parts), zinc oxide (5 parts), stearic acid (3 parts), vulcanization accelerator DM (dibenzothiazyl disulfide) (1 part), vulcanization accelerator DT (diorthotolyl guanidine) (0.3 parts), sulfur (2 parts) and antioxidant 2246 (1 part) were mixed on an 8-inch mixing mill to give an unvulcanized composition for preparing the vulcanizate. This composition (Mooney viscosity (ML$_{1+4}$, 100°C.) 45) showed a stress at 50% elongation of 0.9 kg/cm$^2$.

For comparison, the same procedure as above was repeated except that zinc acetate (2 parts) was used in place of magnesium hydroxide (2 parts). The resultant composition showed only 0.6 kg/cm$^2$ of stress at 50% elongation under the same conditions.

The said unvulcanized composition containing magnesium hydroxide was cured by heating at 145°C. for Table 1

| Metal Compound | | Green Strength[1] | | | Properties of Vulcanizate | |
| --- | --- | --- | --- | --- | --- | --- |
| Type | Amount (phr) | 300% Modulus (kg/cm$^2$) | Tensile Strength (kg/cm$^2$) | Vulcanization Rate T$_{90}$(min) | Tensile[2] Strength (kg/cm$^2$) | Tear[3] Resistance (kg/cm$^2$) |
| ZnO | 1.5 | 1.5 | 2.5 | 16 | 315 | 95 |
| NaOH | 1.5 | 3.5 | 8.7 | 14 | 310 | 93 |
| Ca(OH)$_2$ | 1.5 | 2.4 | 4.9 | 15 | 312 | 94 |
| PbO | 1.5 | 2.2 | 3.7 | 15 | 308 | 93 |
| Mg(OH)$_2$ | 1.5 | 2.1 | 3.5 | 15 | 316 | 97 |
| Ba(OH)$_2$ | 1.5 | 1.9 | 3.3 | 16 | 312 | 91 |
| NaOH | 4 | 6.5 | 11.2 | 9 | 253 | 72 |
| Cu(OH)$_2$ | 1.5 | 1.8 | 2.7 | 16 | 317 | 98 |
| Al(OH)$_3$ | 1.5 | 1.7 | 2.8 | 15 | 311 | 95 |

Note:
[1] Cross head speed 2 cm/minute, 30°C. using an Instron Tester
[2] Cross head speed 50 cm/minute, 25°C. using an Instron Tester
[3] JIS K 6301 B type It is obvious from Table 1 that the mechanical properties of the unvulcanizates prepared by using the supporting additives according to the present invention were highly improved and the vulcanizates therefrom had satisfactory physical properties.

20 minutes, and the resultant vulcanizate showed a tensile strength of 210 kg/cm$^2$. When no magnesium hydroxide was used, the resultant vulcanizate showed a tensile strength of 212 kg/cm$^2$. Therefore, it is apparent that the mechanical properties of the vulcanizate were not lowered by the addition of magnesium hydroxide.

While the invention has been described with reference to preferred embodiments thereof, those skilled in the art will realize that various changes, modifications and substitutions may be made therein without departing from the spirit and scope of the invention. It is the

What is claimed is:

1. An unvulcanized rubber composition having a high green strength and being useful for the preparation of a vulcanizate, said composition comprising a modified cis-1,4-polyisoprene rubber having a bound maleic anhydride content of from 0.03 to 2.5 moles per 100 recurring units of isoprene nonomer in the rubber polymer, and rubber compounding ingredients contaning sulfur as a vulcanizing agent for said rubber, 0.5 to 3.0 parts by weight based on 100 parts by weight of said rubber, of a hydroxide of a metal belonging to Group II A of the Periodic Table, 2 to 8 parts by weight of zinc oxide based on 100 parts by weight of said rubber and stearic acid in an effective amount for the control of scorch.

2. The composition of claim 1, wherein said rubber has a cis-1,4 content of at least 80%.

3. The composition of claim 1, further consisting essentially of rubber compounding ingredients including vulcanization accelerators, fillers, extenders or antioxidants or mixtures thereof.

* * * * *